United States Patent [19]

Miura et al.

[11] Patent Number: 4,662,130
[45] Date of Patent: May 5, 1987

[54] EXTENDIBLE STRUCTURE

[75] Inventors: Koryo Miura, 9-7, Tsurukawa 3-chome, Machida-shi, Tokyo; Takayuki Kitamura, Yokosuka; Kakuma Okazaki; Kazuhiro Abe, both of Yokohama, all of Japan

[73] Assignees: Koryo Miura; Japan Aircraft Mfg. Co., Ltd., both of Tokyo, Japan

[21] Appl. No.: 884,455

[22] Filed: Jul. 11, 1986

[30] Foreign Application Priority Data

Jul. 15, 1985 [JP] Japan ............................ 60-108051[U]

[51] Int. Cl.$^4$ ............................................. E04H 12/18
[52] U.S. Cl. ........................................ 52/108; 52/646
[58] Field of Search ................... 52/108, 109, 117, 110, 52/111, 118, 121–123, 638, 645, 646; 182/152, 40, 41; 135/103, 104

[56] References Cited

U.S. PATENT DOCUMENTS 3,486,279 12/1969 Webb ..................................... 52/108
4,334,391 6/1982 Hedgepeth et al. ................... 52/108
4,532,742 8/1985 Miura ..................................... 52/108

Primary Examiner—J. Karl Bell
Attorney, Agent, or Firm—Martin A. Farber

[57] ABSTRACT

An extendible structure includes at least three extendible longerons and a plurality of integrated radial spacers. Each spacer includes a plurality of legs integrally formed therewith to radially extend from the central part thereof. The distal end of each of the spacers is connected to a corresponding one of the extendible longerons. In the extended state of the extendible structure, at least three longerons are deployed in parallel with one another with space intervals among them in the lateral direction which intersect with the direction of extension of the longerons, and the spacers support the longerons with the horizontally spaced interval within a plane substantially perpendicular to the direction of extension of the longerons. In the collapsed condition of the extendible structure, each of the longerons is collapsed in a loop form, and the spacers are laid one upon another inside the loop formed by the longerons while the legs of the spacers are twisted.

9 Claims, 21 Drawing Figures

EXTENDIBLE STRUCTURE

BACKGROUND OF THE INVENTION

This invention relates to an extendible structure and, more particularly, it is concerned with such an extendible structure that can be confined in a small space when it is collapsed, and deployed into a longitudinal truss when it is extended. More concretely, the invention has reference to an extendible structure which is used for an extendible mechanism for a paddle of a solar battery for use in some outer space applications.

Many of the present and future structural objects to be used in the outer space applications are generally required to have larger dimensions. However, since such structural members should be carried into the outer space aboard rockets, space shuttles, and other modules, they are subjected to restriction by the dimension in the cargo bay of such carrying vehicles.

As a prior art paying attention to this technical problem, there has been known, for example, U.S. Pat. No. 3,486,279, the outline of which is as shown in FIGS. 16 through 18 of the drawing of this application, wherein the deployable lattice column is constructed with three longerons (1), a plurality of rod-like spacers (2) made up of thin square bars and joined at the horizontal positions with the longerons (1) through coupling portions (or joints) (4), and numerous lanyards (3) extended diagonally to connect the joints (4) at diagonally opposed positions.

In this construction, the principle of collapse and extension of the structure is based on the properties of the structural material such that, when a compressive force is applied to the structure extended in a mast-shape in the direction of its center axis, it is wound into a coil-form, and, when the compressive force is released, it extends rectilinearly to return to the mast-shape. While this type of structure is a constructed object, it is also a kind of mechanism. Number of the component parts are innumerable even at the last, hence number of the hinges for combining these component parts amount to be considerable. This would increase, needless to say, the number of inspections to be performed in the functional tests of the structure, which suggests, in the case of its utilization in the outer space application, in particular, demanding extremely high reliability in operation, considerable time to be spent for the inspections and exorbitant cost to be accompanied therewith. As a matter of fact, the cost for the inspection surpasses too far the cost for its manufacture.

On the part of the manufacturer, since the mast-shaped structure capable of functioning properly is first obtained by delicate and minute adjustments in length of the component parts so that the tensile force and the compressive force among them may be in adequately balanced conditions, there would incur considerable time and labor in the adjustments of such numerous component parts, as the consequence of which there has been desire for improvements in the aspects of the reliability and the manufacturing cost of such product.

The present inventors have already proposed an extendible structure having a smaller number of joints of spacers coupled to longerons, as described in U.S. Pat. No. 4,532,742. As shown in FIGS. 19 through 21, this extendible structure comprises three longerons (1A) and a plurality of spacers (2A) of a Rahmen structure spaced by a predetermined distance along the longitudinal direction of the longerons (1A). The spacers (2A) have radial legs (2a) at positions corresponding to the longerons (1A). Each leg (2a) is pivotally coupled to the corresponding longeron (1A) at a joint (4A) shown in FIG. 21. A large number of diagonal lanyard (3A) are connected between the joints (4A), and the overall rigidity of the extendible structure in the extended state can be improved thereby. Therefore, the numbers of spacers (2A) and hinges of the joints (4A) can be reduced compared with the extendible structure shown in FIGS. 16 through 18. The spacers (2A) receive bending moments so that the overall rigidity of the extendible structure can be improved. However, the structure described in U.S. Pat. No. 4,532,742 has several disadvantages. Although the numbers of component parts and hinges are reduced compared with the extendible structure described in U.S. Pat. No. 3,486,279, a large number of joints (4A) is required. High precision is required for the joints (4A), the yield thereof is decreased, and hence the manufacturing cost is increased. Since these joints (4A) have a large number of mechanical movable members, inspections and function tests for the joints (4A) are timing-consuming and cumbersome. Thus, cost reduction is not yet satisfactory, i.e., the conventional extendible structures are still expensive.

SUMMARY OF THE INVENTION

It is a primary object of the present invention to provide an extendible structure which is light in weight and made up of as less numbers of component parts as possible, wherein the yield of joints is high, function tests can be simplified, and the number of inspection steps can be reduced.

In order to achieve the above object of the present invention, there is provided an extendible structure, comprising in combination: at least three extendible longerons; and a plurality of integrated radial spacers provided along the extendible longerons at equal intervals, each having a plurality of legs integrally formed thereon to radially extend from the central part thereof, a distal end of each of the legs being connected to a corresponding one of the extendible longerons, in the extended state of the extendible structure, the at least three longerons being deployed in parallel to one another with space intervals among them in the lateral direction which intersect with the direction of extension of the longerons, and the spacers supporting the longerons with the horizontally spaced interval within a plane substantially perpendicular to the direction of extension of the longerons, and in the collapsed state of the extendible structure, each of the longerons being collapsed in a loop form, and the spacers being laid one upon another inside the loop formed by the longerons while the legs of the spacers are twisted.

The foregoing objects, other objects as well as the specific construction and operations of the extendible structure according to the present invention will become more apparent and understandable from the following detailed description of a few preferred embodiments thereof, when read in conjunction with the accompanying drawings.

DESCRIPTION OF THE PREFERRED EMBODIMENTS

Preferred embodiments of the present invention will be described with reference to FIGS. 1 through 15.

Figure 1:
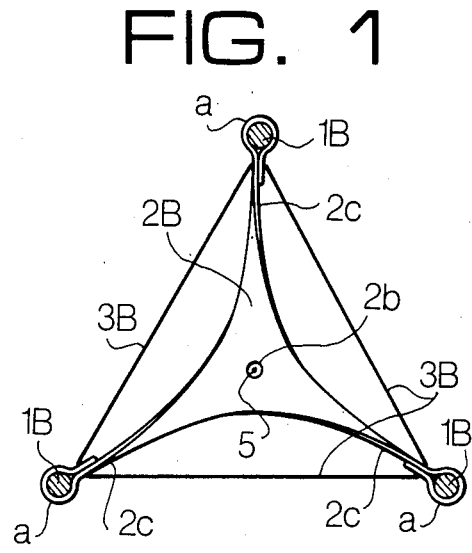
FIG. 1 is a horizontal cross-sectional view of one preferred embodiment of an extendible structure according to the present invention in its developed or extended state.
Figure 2:
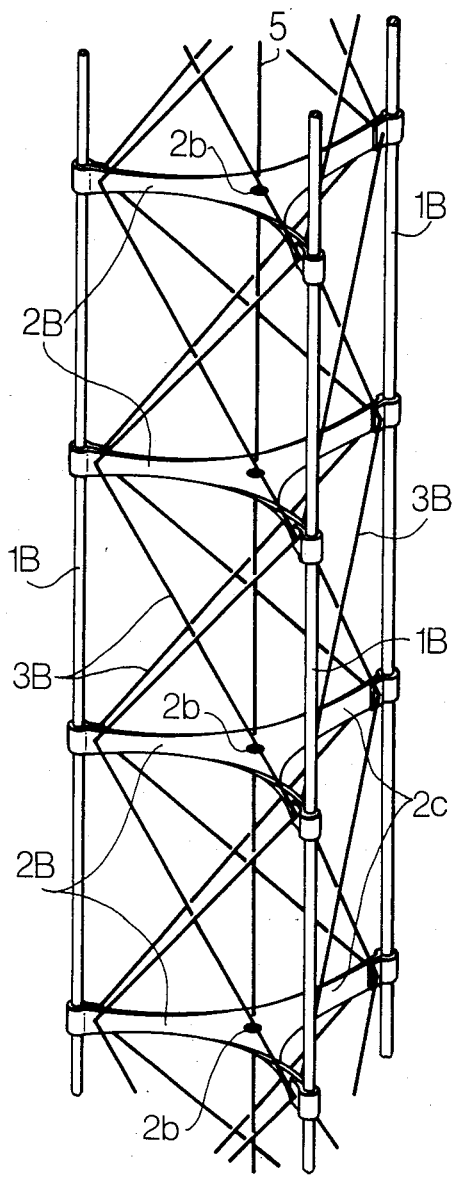
FIG. 2 is a perspective view, in part, of the extendible structure shown in FIG. 1.
Figure 3:
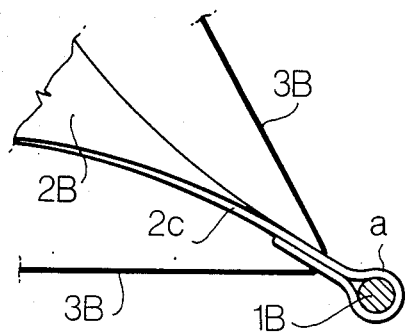
FIG. 3. is an enlarged cross-sectional view, in part, showing a connection between a longeron and a spacer in the preferred embodiment of the present invention shown in FIG. 1.

FIGS. 1 through 3 show an extendible structure according to a first embodiment of the present invention. Referring to FIGS. 1 through 3, three longerons 1B made of a flexible material such as FRP (fiber reinforced plastics), etc. stand upright in parallel with a predetermined space interval being provided among them in the lateral direction, and a plurality of spacers 2B are horizontally provided at predetermined space intervals among them and along the longitudinal direction of the longerons 1B to interconnect the same. The spacers 2B are made of the same material (e.g., FRP) as that of the longerons 1B. Each of the spacers 2B, in addition, are positioned within a plane substantially perpendicular to the longitudinal direction of the longerons 1B. Each spacer 2B has a through-hole 2b formed at the central part thereof. Each spacer 2B has legs 2c, the number of which is equal to the number of longerons 1B. In the first embodiment, the legs 2c are integrally formed with the spacer 2B while radially extending outward from the central part thereof. Ends a of the legs 2c are twisted and extend vertically, as shown in FIG. 3. The ends a are wound around corresponding longerons 1B, and are fixed thereto by an adhesive. However, the ends a need not be fixed to the longerons 1B by an adhesive. For example, in a large extendible structure, the ends a may be fixed to the longerons 1B by rivets or other fastening means. In the extended state shown in FIGS. 1 through 3, the legs 2c of the spacers 2b are kept in an initial state so that they do not receive a torsion force, or receive only a slight torsion force if any. In the collapsed state of the extendible structure (to be described later), the legs 2c of the spacers 2B are elastically deformed within the same plane as that of the spacers 2B, and provide an auxiliary force to extend the longerons 1B by their torsion energy. The shape and structure of the spacers 2B are not limited to those described above. For example, the legs 2c can be located in the same plane as that of the central part of the spacer 2B, and the legs 2c may be twisted vertically when the legs 2c are coupled to corresponding longerons 1B. In this case, the legs 2c are held in the initial load state when they are coupled to the longerons 1B. When the extendible structure is collapsed, the load on the legs 2c is increased. In other words, according to the present invention, when the legs 2c are coupled to the longerons 1B, a negative or positive load act, on the legs 2c, or no load acts thereon.

Each of a plurality of bridles 3B is coupled between the end a of one leg 2c of a given spacer 2B and the end a of another leg 2c of a spacer 2B adjacent to the given spacer 2B, which is in a diagonal relationship to the leg 2c the given spacer 2B. When the extendible structure is extended, the rigidity of the structure can be further improved. A lanyard 5 of a single wire extends through the through-holes 2b of the spacers 2B along the longitudinal direction of the longerons 1B. The upper end of the lanyard 5 is fastened to the uppermost spacer 2B (not shown), and the lower end thereof is coupled to a delivery device (not shown). The lanyard 5 is extended by the delivery device along the longitudinal direction of the longerons 1B.

In the following, explanations will be made as to a state wherein this extendible structure has been collapsed in a loop form, and a state wherein it is on the way of extension.

Figure 4:
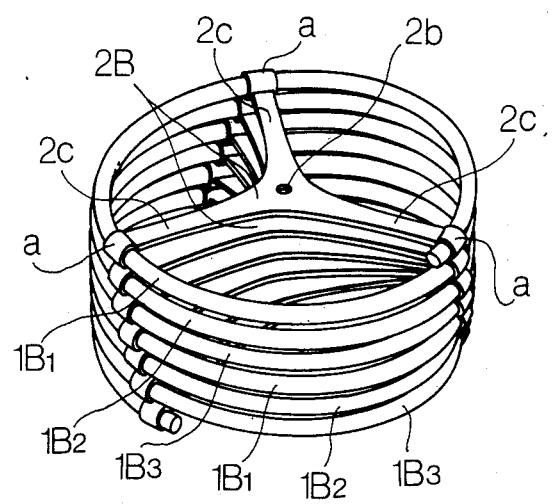
FIG. 4 is a perspective view of the embodiment of the extendible structure according to the present invention shown in FIG. 1 when it is collapsed.

In its collapsed state, the three longerons 1B are superimposed on one another in a smoothly coiled form as shown in FIG. 4, and its external appearance as a whole is in a cylindrical form. In this superimposed state, each of the longerons $1B_1$, $1B_2$, and $1B_3$ is mutually adjacent in a certain definite sequence such that the longeron $1B_2$ is beneath the longeron $1B_1$, the longeron $1B_3$ is underneath the longeron $1B_2$, and the longeron $1B_1$ is underneath the longeron $1B_3$. Each spacer 2B having radially projecting legs 2c is positioned inside the loop formed by the longerons 1B, as is apparent from FIG. 4, and the through-holes 2b in these spacers 2B are aligned on one line as viewed from the vertical direction. The spacers 2B which are laid on one another are slightly and sequentially offset in the circumferential direction of the coiled longerons 1B with the through-holes 2b therein as the center. In the compressive or collapsed state, although the legs 2c of each spacer 2B are positioned within the same plane as that of the central part of the spacer 2B, the legs 2c are elastically deformed by torsion deformation of the extendible structure and are deformed in the bending direction, thereby storing torsion energy.

Figure 5:
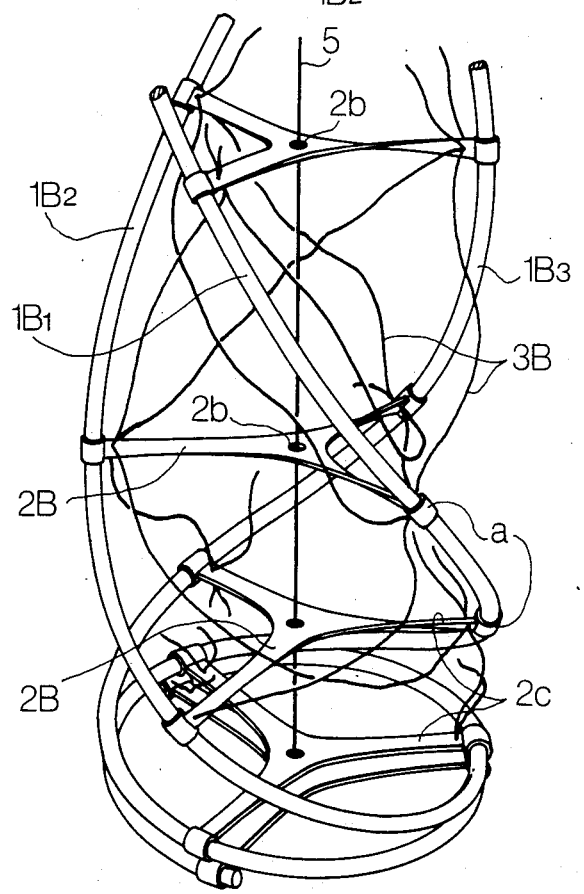
FIG. 5 is a perspective view of the preferred embodiment shown in FIG. 1 showing a state wherein it is being extended from the collapsed state.

In the collapsed state of the extendible structure as explained above, when the bridle 5 is drawn out upwardly by the delivery device (not shown in the drawing) with the bottom end part of the coil-shaped longerons 1B being held firmly, the spacers 2B rotate with the bridle 5 as the center of rotation following this drawing operation, while the longerons 1B collapsed in the coil shape are being extended in such as fashion that the loop may be dissolved, as shown in FIG. 5, and, after completion of the draw-out operation, it assumes the upright condition, as shown in FIG. 2. In the extending process, energy stored by the legs 2c of the spacers 2B in the collapsed state is gradually released to provide an auxiliary force for extension of the longerons 1B. Therefore, in the structure according to the first embodiment, the process for extending the structure from the collapsed state of FIG. 4 to the extended state of FIG. 2 can be stabilized.

Incidentally, when collapsing this structure which is in the perfectly extended state, the reverse to the above-described steps are performed, whereby the structure is collapsed in the loop form to return to the condition as shown in FIG. 4.

In the following, another embodiment of the extendible structure according to the present invention will be explained in reference to FIG. 6. This embodiment is made up of two units of the extendible structure shown in FIGS. 1 through 5 combined into a single unitary form. That is to say, this extendible structure is constructed with two units 10 and 20 of the extendible structure which are disposed in series and a delivery section, i.e., storage drum 6 interposed at the center of these two units 10 and 20. Each of the units 10 and 20 is constructed in the same way as that of the aforedescribed embodiment. That is, the spacers 2B and 2C having the radially projecting legs 2c are connected with three longerons 1B and 1C through the ends a of the legs 2c, for each unit, the bridles 3B and 3C are extended between the adjacent ends a of the legs 2c are at the diagonally opposed positions, and the lanyards 5B and 5C pass through the central parts of the spacers 2B and 2C.

The highly characteristic points of this embodimental structure here are that: first, this pair of units 10 and 20 are mutually connected at their one end part with the central storage drum 6, either directly or indirectly; secondly, the direction of the coil formation in each unit is symmetrical to form a mirror image on the march of the central delivery section, i.e., drum 6; and thirdly, the drawout of the upper and lower lanyards 5B and 5C is synchronized.

In this extendible structure, when the lanyards B and 5C are drawn out to both upper and lower directions from its collapsed state, these upper and lower units 10 and 20 extend to an equal length. In this case, the direction of separation of the coil-shaped longerons 1B in the respective upper and lower units 10 and 20 is mutually symmetrical to form a mirror image as viewed at the central storage drum 6, and both outer end parts of the upper and lower units 10 and 20 rotate in the same direction at a substantially equal speed. As the consequence of this, both units do not rotate relatively. Inversely, even when both outermost end parts of these units are restrained so as not to rotate around the axis, the units continue their extension, and the central storage drum 6 rotates instead. Upon completion of the extension, there will be formed a rigidly continued mast-shaped structure without any rotationally sliding part in its main structure. In the extension process, the units 10 and 20 respectively bias the longerons 1B and 1C in an extending direction by the torsion energy stored in the spacers 2B and 2C. Thus, when compared with the case that does not use torsion energy, smooth extension of the longerons 1B and 1C can be expected.

A similar example for assisting understanding of the above-mentioned phenomenon may be realized by extending a rubber band between the thumb and the index finger, and then putting a match stick at an intermediate position of the extending rubber band, followed by twisting the band in one direction. In this instance, the direction of the loop formation is symmetrical in a mirror image, the both ends do not rotate as a matter of course, with the central part alone being rotated, and no sliding part exists at any portion of the loop. In other words, the formation and the dissolution of a pair of mirror-imaged loops offset the relative rotation at both ends of the loops.

There has also been known a so-called canister device which purports to contribute to maintenance of the rigidity in the rectilinear longerons, wherein, at the time of extension of the units of the extendible structure, the sliding rotation of the end parts and the transitary movement from the coiled form to the rectilinear extension are effected in the canister device without performing any apparent rotation. In the embodiment of FIG. 6, if a structure of two canister devices (delivery devices) joined together back to back is adopted as the central storage drum 6 and then the main structural members of the two units 10 and 20 are mutually connected through the canister devices (delivery devices), there can be obtained the extendible structure which maintains sufficient rigidity even during its extension.

Figure 6:
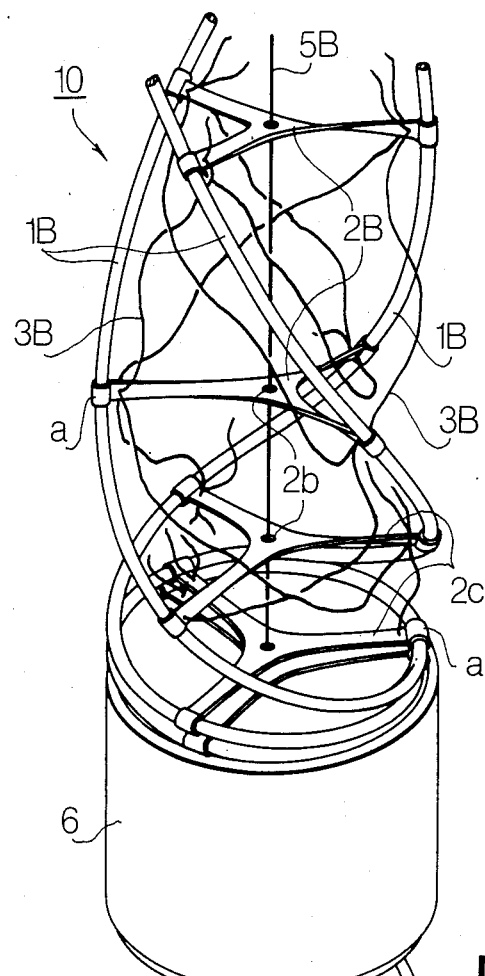
FIG. 6 is a perspective view of another embodiment of the extendible structure according to the present invention showing a state wherein the structure is being extended.
Figure 6:
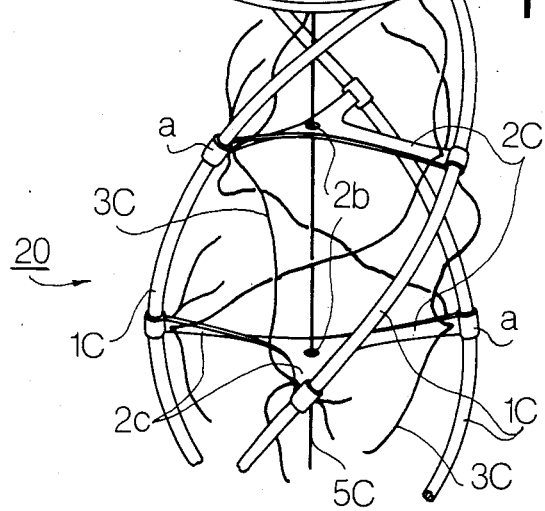
Figure 7:
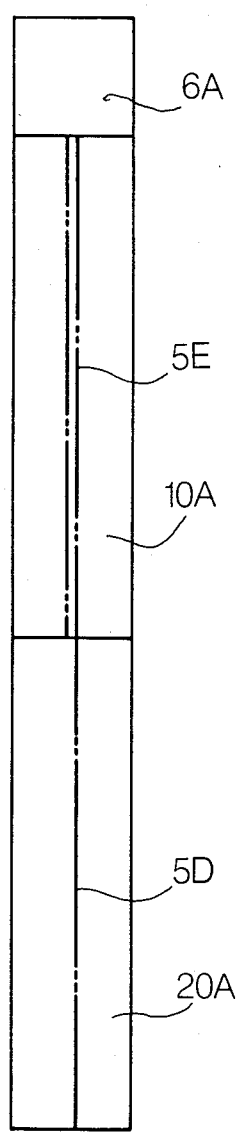
FIG. 7 is a schematic diagram showing still another embodiment of the extendible structure according to the present invention.
Figure 8:
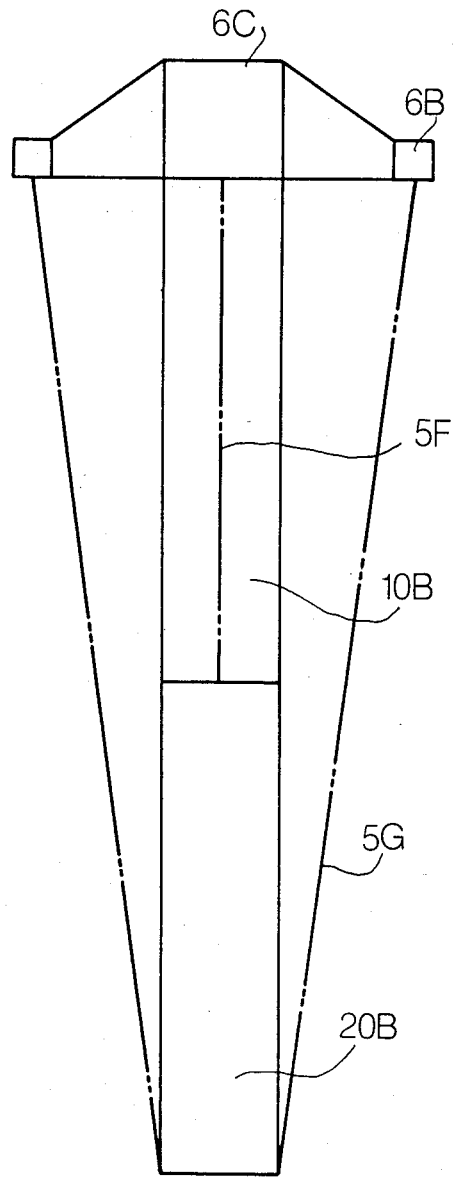
FIG. 8 is a schematic diagram showing other embodiment of the extendible structure according to the present invention.

Since the fundamental concept of the embodiment shown in FIG. 6 resides in restraining the rotation at the end parts of the loop by the serial connection of a plurality of units forming the loops in the mutually opposite directions, there may be further contemplated those embodiments as shown in FIGS. 7 and 8.

The embodiment of FIG. 7 is such that units 10A and 20A are provided on one side of a storage drum 6A, wherein the length of extension of both units 10A and 20A are kept equal. A lanyard 5D for the unit 20A is connected with the storage drum 6A through the unit 10A, and, when the delivery speed of the lanyard 5D is made, for example, twice as fast as that of a lanyard 5E, the unit 20A extends by an equal length as that of the unit 10A, and performs an equal angular rotation without the relative rotation at both end parts.

In the embodiment shown in FIG. 8, a unit 10B and a unit 20B are so constructed that their extension and collapse may be done by separate delivery sections 6B and 6C, wherein a lanyard 5F of the unit 10B is drawn out in the direction parallel to the direction of extension of the unit 10B, while a lanyard 5G of the unit 20B is drawn out slantly with respect to the direction of extension of the unit 20B so as to intersect mutually. In more detail, the lanyard 5G of the unit 20B is extended outside the units 10B and 20B, and controlled by the delivery section 6B so that, upon completion of the extension, it may contribute to rigidity of the unit as a tension-imparting member.

It should be noted incidentally that the two units 10B and 20B may not always be synchronized accurately in their rotation, even if their extension is brought into synchronism. However, when restriction is imparted to the rotation at both end parts, the units 10B and 20B are accurately synchronized in their rotation. In this embodiment, when the lanyards 5G are disposed in a three-dimensional manner, the rotation at both end parts is restrained and, in addition, a stable construction of the extendible structure is secured after it has been extended.

A mention is made here as to the longerons 1B and 1C in the above-described embodiments. When collapsing these longerons 1B and 1C in the loop form, there may be used any of the well known methods for regulating the loop forming direction, such as the one wherein the cross-sectional shape of the longerons 1B and 1C is varied in part, and the one wherein an initial twisting force is imparted to the longerons 1B and 1C.

By the way, in the foregoing explanation, an example of a case has been given, wherein each of the longerons 1B and 1C is made of a single, elastic, and continuous material. However, each of such longerons 1B and 1C may be made up of a material having numerous joints, i.e., the longeron is constructed with numerous pieces of longeron and a plurality of rotary joints to sequentially connect these longerons pieces, as disclosed, for example, in U.S. Pat. No. 3,486,279.

Furthermore, a construction which becomes tapered in the longitudinal direction in its extended state, or a construction with the cross-section of the structure being varied along the longitudinal direction may also be effective under particular conditions. Also a structure of a design, wherein the longeron is sectioned at a certain definite length in the longitudinal direction and a plurality of such sectioned longerons, each being as one section, are connected together, may be particularly effective from the point of productivity.

There are various modifications for the integrated radial spacers 2B having radially projecting legs formed integrally with the central part as shown, for example, in FIGS. 9 to 14.

Figure 9:
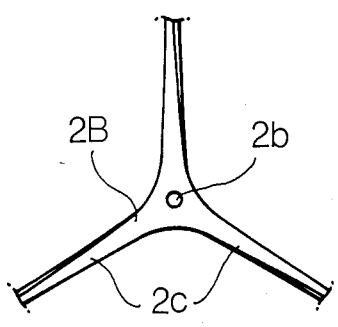
FIG. 9, is a top plan view showing another embodiment of the spacer for use in the extendible structure according to the present invention.

In the example of FIG. 9, the spacer has an area at the central part thereof, which is smaller than that shown in FIG. 1.

Figure 10:
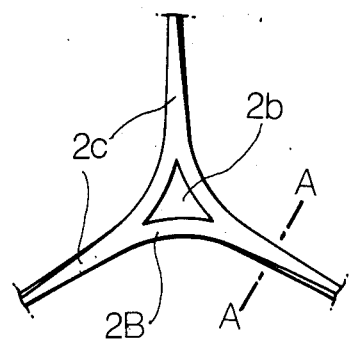
FIG. 10 is a top plan view showing still another embodiment of the spacer.
Figure 11:
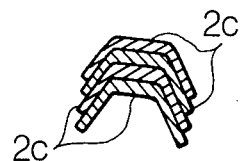
FIG. 11 is a cross-sectional view, taken along a line A—A in FIG. 10, when a plurality of spacers are arranged one after the other in a snugly fitted manner.

The example of FIG. 10 has a triangular shape of the through-hole 2b at the central part thereof, and has the side edges of the legs 2c are bent downward obliquely as shown in FIG. 11, thus forming a groove in the leg as a whole. According to this construction, reduction in weight and increase in mechanical strength of the spacer can be realized, whereby, when the extendible structure of the present invention is collapsed, the spacers, each having the groove-shaped legs, can be superimposed snugly one another.

Figure 12:
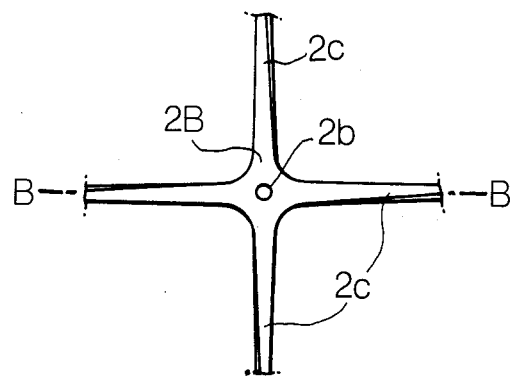
FIG. 12 is a top plan view showing other embodiment of the spacer.
Figure 13:
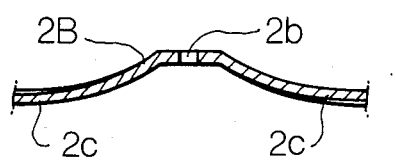
FIG. 13 is a longitudinal cross-sectional view of the spacer taken along a line B—B in FIG. 12.

In a modification of FIG. 12, four legs 2c project radially from the central part of the spacer, and the cross-sectional shape of the legs 2c is smoothly bent downward as it goes outward from its central part, as shown in FIG. 13, in consideration of reduction in weight and appropriate distribution of rigidity of the spacer.

Figure 14:
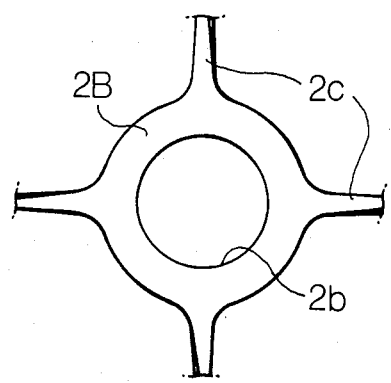
FIG. 14 is a top plan view showing still other embodiment of the spacer for use in the extendible structure according to the present invention.

A modification of FIG. 14 provides four legs 2c to project from an annular central part, wherein the diameter of the through-hole 2b is approximate to the length of the leg 2c.

Figure 15:
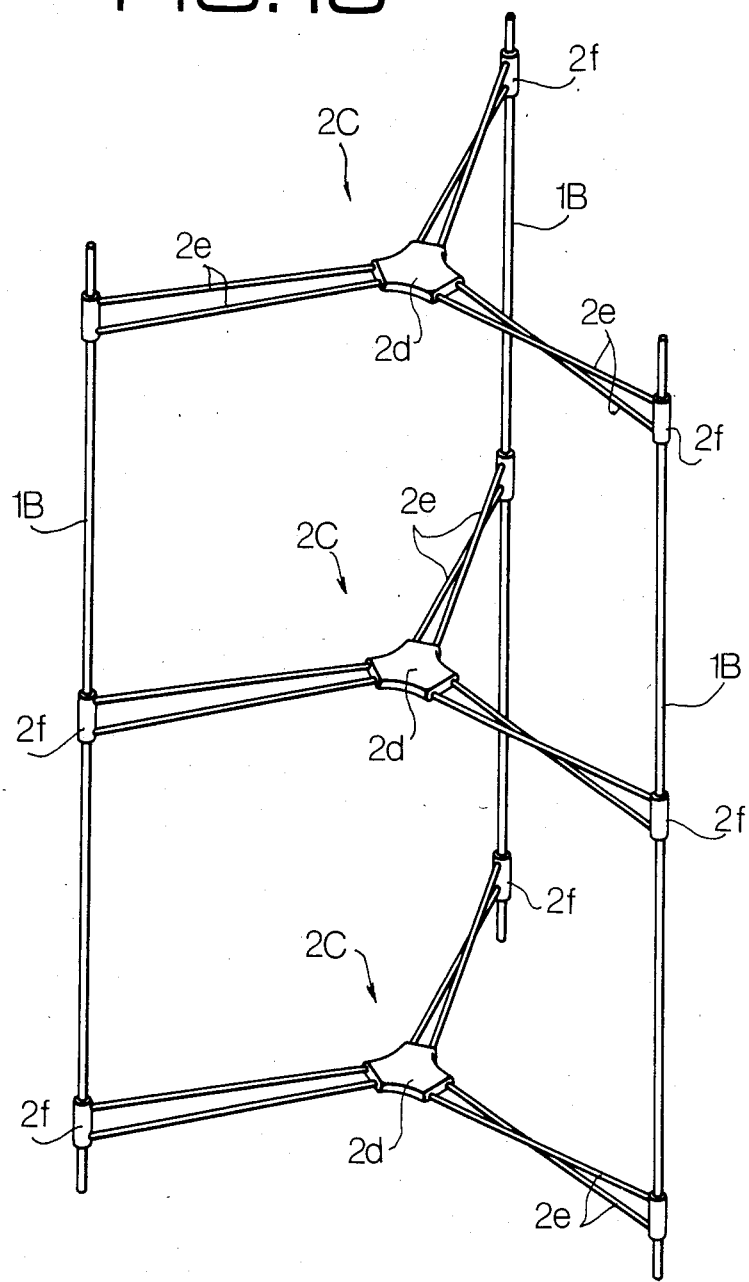
FIG. 15 is an enlarged perspective view of the extendible structure in its extended state using another spacer according to the present invention.
Figure 16:
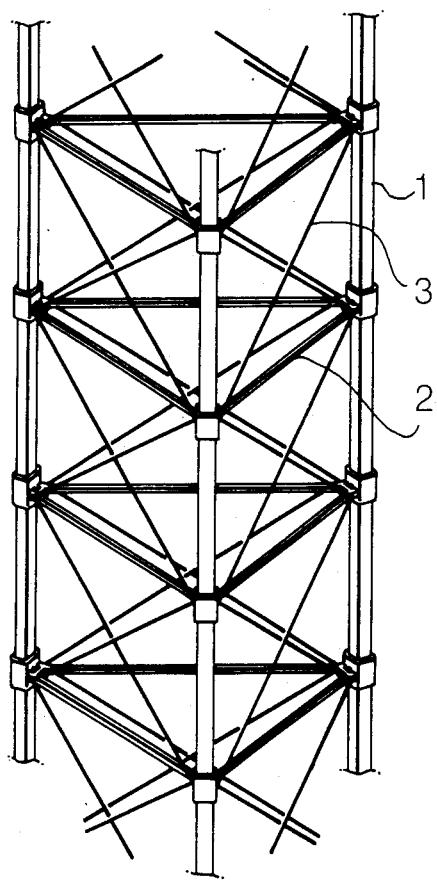
FIG. 16 is a perspective view, in part, of a conventional extendible structure in its developed or extended state.
Figure 17:
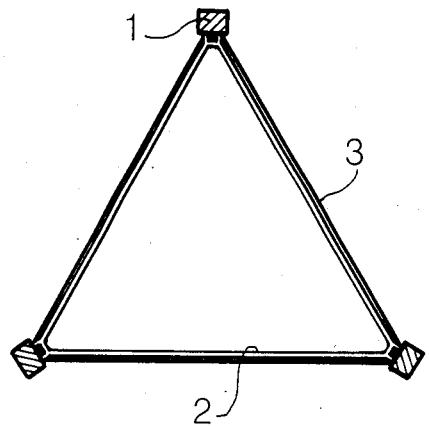
FIG. 17 is a horizontal cross-sectional view of the conventional extendible structure shown in FIG. 16.
Figure 18:
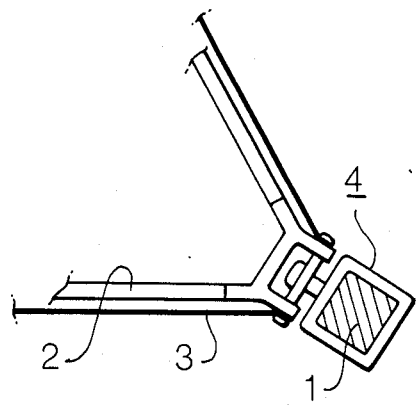
FIG. 18 is an enlarged cross-sectional view, in part, showing a connection between a longeron and a spacer in the conventional extendible structure shown in FIG. 16.
Figure 19:
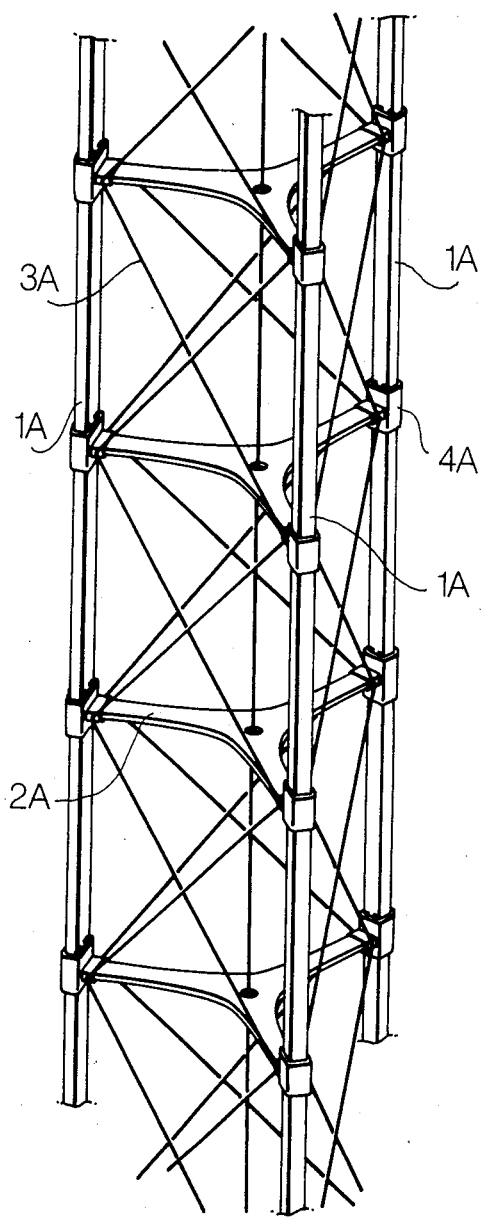
FIG. 19 is a perspective view, in part, of another conventional extendible structure as an improved structure of FIG. 16 in its developed or extended state.
Figure 20:
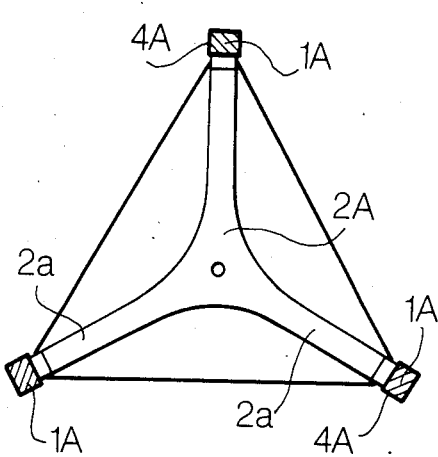
FIG. 20 is a horizontal cross-sectional view of the conventional extendible structure shown in FIG. 19.
Figure 21:
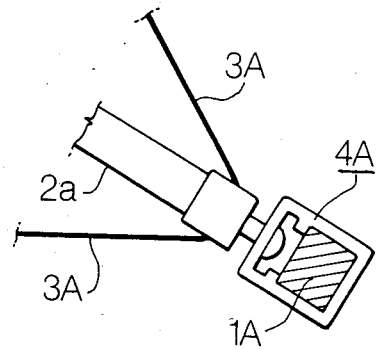
FIG. 21 is an enlarged cross-sectional view, in part, showing a connection between the longeron and the spacer in the conventional extendible structure shown in FIG. 19.

FIG. 15 is an enlarged view of an extending structure using spacers 2C of still another embodiment of the present invention. The extendible structure is suitable for an application which does not require high rigidity. In the embodiment of FIG. 15, the bridles and the lanyard are omitted. Each spacer 2c comprises a rigid central member 2d and a plurality of pairs of pipes, i.e., pairs of rod-like members 2e radially extending from the central member 2d. The distal ends of each pair of rod-like members 2e are fixed to a fixing cylinder 2f. The fixing cylinders 2f are mounted on corresponding longerons 1B at a predetermined distance interval. The rod-like members 2e share the torsion load and the spacer 2C has a Rahmen structure which can receive bending moments, thereby obtaining a lightweight and inexpensive extendible structure.

The above embodiments exemplify extendible structures for outer space applications. However, the extendible structures of the present invention can also be applied to other fields.

According to the present invention as described above, the spacer itself has the Rahmen structure and the resultant extendible structure does not use hinges at all. In function tests and inspections, only the connections between the spacers and the longerons need be checked to maintain high precision, thereby providing a highly reliable extendible structure at low inspection cost and requiring only, simple function tests.

In the foregoing, the present invention has been described specifically with reference to preferred embodiments thereof. It should, however, be noted that these embodiments are merely illustrative and not so restrictive, and that any changes and modifications may be made by those skilled in the art within the ambit of the present invention as recited in the appended claims.

What is claimed is:

1. An extendible structure, comprising in combination:
    at least three extendible longerons; and
    a plurality of integrated radial spacers provided along said extendible longerons at equal intervals, each having a plurality of legs integrally formed thereon to radially extend from the central part thereof, a distal end of each of said legs being connected to a corresponding one of said extendible longerons,
    in the extended state of said extendible structure, said at least three longerons being deployed in parallel to one another with space intervals among them in the lateral direction which intersect with the direction of extension of said longerons, and said spacers supporting said longerons with the horizontally spaced interval within a plane substantially perpendicular to the direction of extension of said longerons, and
    in the collapsed state of said extendible structure, each of said longerons being collapsed in a loop form, and said spacers being laid one upon another inside said loop formed by said longerons while said legs of said spacers are twisted.

2. The extendible structure according to claim 1, wherein each of said at least three longerons comprises a single elastic, continuous, flexible member.

3. The extendible structure according to claim 1, wherein said longerons are collapsed in a coil form, and extend spirally from said collapsed state.

4. The extendible structure according to claim 1, wherein each of said spacers comprises a plate member integrally provided with said legs.

5. The extendible structure according to claim 1, wherein each of said spacers comprises a plate-like central member and a plurality of pairs of rod-like members radially extending from said central member, distal ends of said pair of rod-like members being fixed at different positions along the longitudinal direction of said corresponding longeron.

6. An extendible structure which comprises in combination:
a first unit of the extendible structure;
a second unit of the extendible structure; and
a connecting section to serially connect said first and second units of the extendible structure,
said first and second units of the extendible structure being so constructed that they may be extended and collapsed symmetrically in a mirror image on the march of said connecting section, and
each of said extendible structure units comprising: at least three extendible longerons; and a plurality of integrated radial spacers, each having a plurality of legs integrally formed with said spacer radially extend from the central part thereof, a distal end of each of said legs being connected to a corresponding one of said extendible longerons, in the extended state of said extendible structure, said at least three longerons being deployed in parallel with one another with space intervals among them in the lateral direction which intersect with the direction of extension of said longerons, and said spacers supporting said longerons with the horizontally spaced interval within a plane substantially perpendicular to the direction of extension of said longerons; and in the collapsed state of said extendible structure, each of said longerons being collapsed in a loop form, and said spacers being laid one upon another inside said loop formed by said longerons while said legs of said spacers are twisted.

7. The extendible structure according to claim 6, wherein there is further provided a delivery device for composite control of the extending speed of said first and second units of the extendible structure.

8. The extendible structure according to claim 7, wherein said delivery device is provided between said first and second units of the extendible structure.

9. The extendible structure according to claim 7, wherein said first and second units of the extendible structure are provided on one and same side as viewed from said delivery device.

* * * * *